US012559186B2

(12) United States Patent
Hu et al.

(10) Patent No.: US 12,559,186 B2
(45) Date of Patent: Feb. 24, 2026

(54) SUPPORTING WHEEL SHAFT, SUPPORTING WHEEL AND WORK MACHINE

(71) Applicant: SANY HEAVY MACHINERY LIMITED, Jiangsu (CN)

(72) Inventors: Xiaokang Hu, Jiangsu (CN);
Chuandong Sun, Jiangsu (CN);
Zhongwei Cheng, Jiangsu (CN)

(73) Assignee: SANY HEAVY MACHINERY LIMITED, Jiangsu (CN)

( * ) Notice: Subject to any disclaimer, the term of this patent is extended or adjusted under 35 U.S.C. 154(b) by 133 days.

(21) Appl. No.: 17/920,756

(22) PCT Filed: Apr. 20, 2022

(86) PCT No.: PCT/CN2022/087884
§ 371 (c)(1),
(2) Date: Oct. 21, 2022

(87) PCT Pub. No.: WO2022/222952
PCT Pub. Date: Oct. 27, 2022

(65) Prior Publication Data
US 2024/0217599 A1     Jul. 4, 2024

(30) Foreign Application Priority Data
Apr. 21, 2021     (CN) ........................ 202110431069.X

(51) Int. Cl.
*B62D 55/092*     (2006.01)
*B62D 55/088*     (2006.01)
*F16J 15/44*     (2006.01)

(52) U.S. Cl.
CPC ......... *B62D 55/092* (2013.01); *B62D 55/088* (2013.01); *F16J 15/441* (2013.01)

(58) Field of Classification Search
CPC ........ B62D 55/15; B62D 55/88; B62D 55/92; F16J 15/441
(Continued)

(56) References Cited

U.S. PATENT DOCUMENTS 2,712,478 A     7/1955   Carroll
3,154,958 A  *  11/1964   Cadwell .............. B62D 55/145
474/902
(Continued)

FOREIGN PATENT DOCUMENTS

CN     102897237 A     1/2013
CN     202911832 U  *  5/2013   ............. B62D 55/14
(Continued)

OTHER PUBLICATIONS

Supplementary Search Report of Priority CN202110431069.x.
(Continued)

*Primary Examiner* — S. Joseph Morano
*Assistant Examiner* — Eva L Comino
(74) *Attorney, Agent, or Firm* — Womble Bond Dickinson (US) LLP

(57)     ABSTRACT
A supporting wheel shaft, a supporting wheel and a work machine. The supporting wheel shaft includes an oil inlet, provided near a middle portion of the supporting wheel shaft and used to communicate with a first oil storage chamber on a wheel body of a supporting wheel; a first oil outlet, provided close to a first end of the supporting wheel shaft and used to extend to a first floating oil seal on the supporting wheel; a second oil outlet, provided close to a second end of the supporting wheel shaft and used to extend to a second floating oil seal on the supporting wheel; and a lubricating oil passage, provided inside the supporting wheel shaft, extends from the first end of the supporting wheel shaft to the second end thereof, and communicates with the oil inlet, the first oil outlet and the second oil outlet, respectively.

12 Claims, 2 Drawing Sheets

(58) Field of Classification Search
USPC ......................................................... 305/100
See application file for complete search history.

(56) References Cited

U.S. PATENT DOCUMENTS

| | | | | |
|---|---|---|---|---|
| 3,515,446 A * | 6/1970 | Maguire | .............. | B62D 55/092 |
| | | | | 384/418 |
| 3,748,711 A * | 7/1973 | Smith | ....................... | B60P 3/41 |
| | | | | 254/323 |
| 3,871,719 A * | 3/1975 | Boggs | .................... | B62D 55/15 |
| | | | | 384/418 |
| 7,073,838 B2 * | 7/2006 | Lee | .................... | B60N 2/01583 |
| | | | | 296/65.03 |
| 9,555,845 B2 * | 1/2017 | Kita | ....................... | B62D 55/14 |

FOREIGN PATENT DOCUMENTS

| | | | | | |
|---|---|---|---|---|---|
| CN | 203637968 | U | | 6/2014 | |
| CN | 207843097 | U | * | 9/2018 | ............. B62D 55/15 |
| CN | 108778913 | A | | 11/2018 | |
| DE | 1807049 | A1 | | 1/1970 | |
| JP | 2000095156 | A | * | 4/2000 | ............. B62D 55/15 |
| JP | 2005248799 | A | | 9/2005 | |
| WO | WO-2015008598 | A1 | * | 1/2015 | ............. B62D 55/15 |
| WO | WO-2017221762 | A1 | * | 12/2017 | ........... B06B 1/0688 |

OTHER PUBLICATIONS

First Search Report of Priority CN202110431069.x.
First Office Action.
Extended European Search Report received in related European Application No. 22773380.5, mailed Mar. 20, 2024, 12 pages.

* cited by examiner

SUPPORTING WHEEL SHAFT, SUPPORTING WHEEL AND WORK MACHINE

CROSS-REFERENCE TO RELATED APPLICATIONS

The present application is the National Phase of International Application No. PCT/CN2022/087884 filed on Apr. 20, 2022, which claims priority to the benefit of Chinese Patent Application no. 202110431069.X filed Apr. 21, 2021, and the disclosures of which are hereby incorporated herein by reference in their entireties.

TECHNICAL FIELD

The present application relates to the field of work machine, in particular to a supporting wheel shaft, a supporting wheel and a work machine.

BACKGROUND

In work machines, supporting wheel is widely used as a chassis bearing part of a crawler excavator, a crane, etc. Since the working load of the supporting wheel is large and a work machine usually operates under poor environments such as a muddy environment and a dusty environment, cement, dust and other impurities are easy to enter the supporting wheel to damage the supporting wheel. The damage of the supporting wheel is mainly embodied in the oil leakage of a floating oil seal of the supporting wheel.

A conventional supporting wheel includes a wheel body and a supporting wheel shaft. The wheel body is rotatably sleeved on the supporting wheel shaft. A side surface of the supporting wheel shaft is in clearance fit with an inner wall surface of a bushing inside the wheel body, and a clearance enables the communication between the left and right chambers where the floating oil seals are located of the supporting wheel. The floating oil seals are mainly lubricated and cooled through lubricating oil in the chambers where the floating oil seals are located.

In actual application, due to the simple structure of the supporting wheel shaft, it only plays a supporting role to the rotation of the wheel body, and is unable to improve the lubricating environment of the floating oil seal of the supporting wheel based on the structure design of the supporting wheel shaft. The floating oil seal is usually damaged because it is difficult to ensure sufficient lubricating oil in the environment of the floating oil seal, which affects the service life of the supporting wheel. In particular, when the supporting wheel is in the tilted working condition, the lubricating oil will flow to the floating oil seal at a low position along the clearance in the supporting wheel, while the floating oil seal and bushing at a high position will suffer excessive wear due to a reduction of the lubricating oil.

SUMMARY

The present application provides a supporting wheel shaft, a supporting wheel and a work machine to solve the problems in the related art, in which the conventional supporting wheel shaft of the supporting wheel fails to improve the lubricating environment of the floating oil seal of the supporting wheel due to its simple structure.

The present application provides a supporting wheel shaft including an oil inlet, a first oil outlet, a second oil outlet and a lubricating oil passage; where the oil inlet is provided near a middle portion of the supporting wheel shaft and used to communicate with a first oil storage chamber on a wheel body of a supporting wheel; the first oil outlet is provided close to a first end of the supporting wheel shaft, and used to extend to a first floating oil seal on the supporting wheel; the second oil outlet is provided close to a second end of the supporting wheel shaft, and used to extend to a second floating oil seal on the supporting wheel; the lubricating oil passage is provided inside the supporting wheel shaft and extends from the first end of the supporting wheel shaft to the second end of the supporting wheel shaft, and the lubricating oil passage communicates with the oil inlet, the first oil outlet and the second oil outlet, respectively.

According to a supporting wheel shaft provided by the present application, the first oil outlet and the second oil outlet are distributed on a same vertical plane, and the first oil outlet and the second oil outlet are both used to discharge oil in an upward direction.

According to a supporting wheel shaft provided by the present application, the lubricating oil passage extends along a central axis of the supporting wheel shaft; at least one of the oil inlet, the first oil outlet and the second oil outlet is arranged along the radial direction of the supporting wheel shaft; and/or the number of the oil inlet is multiple, and the multiple oil inlets are arranged circumferentially relative to the central axis of the supporting wheel shaft.

According to a supporting wheel shaft provided by the present application, the first end of the supporting wheel shaft is provided with a first installation hole, and the second end of the supporting wheel shaft is provided with a second installation hole; an oil filling port is provided between the first installation hole and one end of the lubricating oil passage and/or between the second installation hole and another end of the lubricating oil passage, and the oil filling port is detachably equipped with a plug.

According to a supporting wheel shaft provided by the present application, side walls of both the first end and the second end of the supporting wheel shaft are provided with an annular sealing groove and an annular stop groove; at the first end of the supporting wheel shaft, the annular sealing groove is located between the annular stop groove and the first oil outlet; at the second end of the supporting wheel shaft, the annular sealing groove is located between the annular stop groove and the second oil outlet; where the annular sealing groove is used to install a sealing ring; the annular stop groove is used to install a retaining ring.

The present application further provides a supporting wheel including a wheel body, a first end cover, a second end cover, a first floating oil seal, a second floating oil seal and the above-mentioned supporting wheel shaft; where the wheel body is rotatably sleeved on the supporting wheel shaft, the wheel body is provided with a first oil storage chamber which communicates with the oil inlet; the first end cover is sleeved on a first end of the supporting wheel shaft; an end surface of the first end cover relative to the first end of the wheel body is provided with a first installation chamber; inside of the first installation chamber is provided with the first floating oil seal, and the first installation chamber communicates with the first oil outlet, the second end cover is sleeved on a second end of the supporting wheel shaft; an end surface of the second end cover relative to the second end of the wheel body is provided with a second installation chamber; inside of the second installation chamber is provided with the second floating oil seal, and the second installation chamber communicates with the second oil outlet.

According to a supporting wheel provided by the present application, the wheel body is further provided with a second oil storage chamber, a third oil storage chamber, a first oil guide passage and a second oil guide passage, the first oil storage chamber, the second oil storage chamber and the third oil storage chamber are isolated from each other; the second oil storage chamber communicates with the first installation chamber through the first oil guide passage, and the third oil storage chamber communicates with the second installation chamber through the second oil guide passage; at least one of the first oil guide passage and the second oil guide passage extends along an axial direction of the wheel body.

According to a supporting wheel provided by the present application, the supporting wheel further includes a first sealing cover and a second sealing cover; all the first oil storage chamber, the second oil storage chamber and the third oil storage chamber extend in the circumferential direction relative to a central axis of the wheel body and form a ring shape; the first oil storage chamber is groove-shaped and provided on an inner wall surface of a middle portion of the wheel body, and a notch of the first oil storage chamber faces a side surface of the supporting wheel shaft; the second oil storage chamber and the third oil storage chamber are both provided in the wheel body, and are respectively provided on two sides of the first oil storage chamber along the axial direction of the wheel body; the first sealing cover is detachably provided between the second oil storage chamber and the first oil storage chamber, to realize an isolation between the second oil storage chamber and the first oil storage chamber; the second sealing cover is detachably provided between the third oil storage chamber and the first oil storage chamber, to realize an isolation between the third oil storage chamber and the first oil storage chamber.

According to a supporting wheel provided by the present application, a first shaft sleeve is provided between a shaft hole of the first end cover and the first installation chamber; a side wall of the first shaft sleeve is provided with a plurality of first oil storage holes, the first oil outlet communicates with the first installation chamber through the first oil storage holes; and/or a second shaft sleeve is provided between a shaft hole of the second end cover and the second installation chamber; a side wall of the second shaft sleeve is provided with a plurality of second oil storage holes, the second oil outlet communicates with the second installation chamber through the second oil storage holes.

The present application further provides a work machine including the above-mentioned supporting wheel shaft or the above-mentioned supporting wheel.

According to the supporting wheel, the supporting wheel shaft and the work machine provided by the present application, it is possible to deliver the lubricating oil stored in the first oil storage chamber on the wheel body to the floating oil seal on the left and right sides of the supporting wheel respectively by providing the oil inlet, the first oil outlet, the second oil outlet and the lubricating oil passage on the supporting wheel shaft, so that the lubricating environment of the floating oil seal on the left and right sides of the supporting wheel maintains sufficient lubricating oil. In this way, compared with the design solution of a conventional supporting wheel, the present application not only increases the amount of lubricating oil at the floating oil seal in the case that the supporting wheel operates in a horizontal state, but also enables the environment of the floating oil seal at a high position to maintain a large amount of lubricating oil even if the supporting wheel inclines to the left or to the right when walking, so that the lubricating oil can play a better role in lubricating and cooling the floating oil seal.

It can be seen that, the present application improves the lubricating environment of the floating oil seal of the supporting wheel, prevents the excessive wear of the floating oil seal and the bushing of the supporting wheel due to a decrease of the amount of lubricating oil, and ensures the service life of the supporting wheel.

BRIEF DESCRIPTION OF DRAWINGS

In order to illustrate the solutions according to the present application or the related art more clearly, accompanying drawings required in the description of the embodiments or the related art are briefly introduced below. The accompanying drawings in the following description are part of the embodiments of the application. For those of ordinary skill in the art, other drawings can also be obtained in view of these drawings in the present application without any creative effort.

REFERENCE NUMERALS

1: supporting wheel shaft; 2: wheel body; 3: first end cover; 4: second end cover; 5: first floating oil seal; 6: second floating oil seal; 7: first sealing cover; 8: second sealing cover; 11: oil inlet; 12: first oil outlet; 13: second oil outlet; 14: lubricating oil passage; 15: first installation hole; 16: second installation hole; 17: plug; 18: annular sealing groove; 19: annular stop groove; 21: first oil storage chamber; 22: second oil storage chamber; 23: third oil storage chamber; 24: first oil guide passage; 25: second oil guide passage; 31: first shaft sleeve; 32: first oil storage hole.

DETAILED DESCRIPTION OF THE EMBODIMENTS

In order to make the objectives, solutions and advantages of the present application more clear, the solutions of the application will be described clearly and completely below in conjunction with the accompanying drawings of the application. It should be noted that, the embodiments described are some of the embodiments of the application rather than all of them. Based on the embodiments according to the application, all other embodiments obtained by those of ordinary skill in the art without making creative effort fall within the scope of protection of the application.

A supporting wheel shaft, a supporting wheel and a work machine provided by the present application will be described below with reference to FIG. 1 to FIG. 4.

Figure 1:
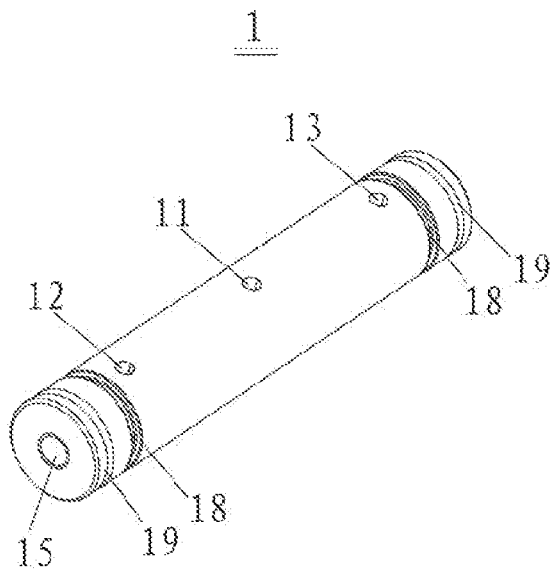
FIG. 1 is a schematic diagram illustrating a three-dimensional structure of a supporting wheel shaft according to the present application.
Figure 2:
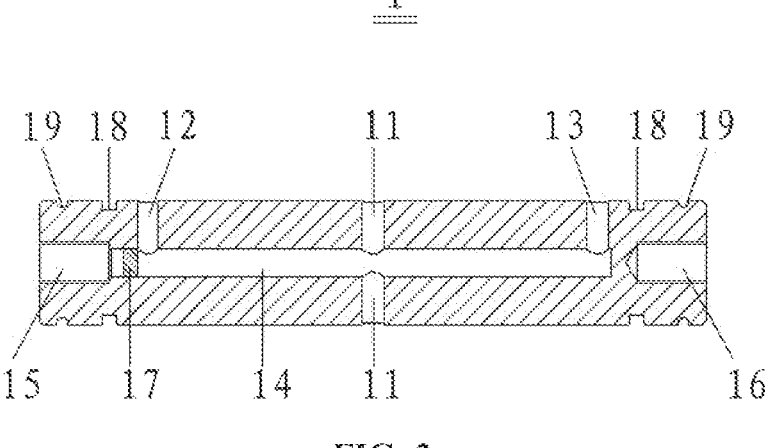
FIG. 2 is a schematic diagram illustrating a cross-sectional structure of a supporting wheel shaft according to the present application.

As shown in FIG. 1 to FIG. 2, an embodiment of the present application provides a supporting wheel shaft 1, including: an oil inlet 11, a first oil outlet 12, a second oil outlet 13 and a lubricating oil passage 14. The oil inlet 11 is provided near a middle portion of the supporting wheel shaft 1 and used to communicate with a first oil storage chamber 21 located on a wheel body 2 of a supporting wheel, the first oil outlet 12 is provided close to a first end of the supporting wheel shaft 1 and used to extend to a first floating oil seal 5 on the supporting wheel; the second oil outlet 13 is provided close to a second end of the supporting wheel shaft 1 and used to extend to a second floating oil seal 6 on the supporting wheel; and the lubricating oil passage 14 is provided inside the supporting wheel shaft 1 and extends from the first end of the supporting wheel shaft 1 to the second end thereof. The lubricating oil passage 14 communicates with the oil inlet 11, the first oil outlet 12 and the second oil outlet 13, respectively. In an embodiment, a middle portion of the lubricating oil passage 14 communicates with the oil inlet 11, and one end of the lubricating oil passage 14 communicates with the first oil outlet 12, another end of the lubricating oil passage 14 communicates with the second oil outlet 13.

In an embodiment, it is possible to deliver the oil stored in the first oil storage chamber 21 on the wheel body 2 to the floating oil seals on the left and right sides of the supporting wheel respectively by providing the oil inlet 11, the first oil outlet 12, the second oil outlet 13 and the lubricating oil passage 14 on the supporting wheel shaft 1, and then the lubricating environments of the left and right floating oil seals of the supporting wheel maintain sufficient lubricating oil. In this way, compared with the design solution of a conventional supporting wheel, the present application not only increases the amount of lubricating oil at the floating oil seal in the case that the supporting wheel operates in a horizontal state, but also enables the environment of the floating oil seal at a high position to maintain a large amount of lubricating oil even if the supporting wheel inclines to the left or to the right when walking, and then the lubricating oil can play a better role in lubricating and cooling the floating oil seal.

It can be seen that the present application improves the lubricating environment of the floating oil seal of the supporting wheel, prevents the excessive wear of the floating oil seal and the bushing of the supporting wheel due to a decrease of the amount of lubricating oil, and ensures the service life of the supporting wheel.

In an embodiment the lubricating oil passage 14 can be implemented to extend along the central axis of the supporting wheel shaft 1, and at least one of the oil inlet 11, the first oil outlet 12 and the second oil outlet 13 is arranged along the radial direction of the supporting wheel shaft 1. One end of the oil inlet 11, one end of the first oil outlet 12 and one end of the second oil outlet 13 communicate with the lubricating oil passage 14, and another end of the oil inlet 11, another end of the first oil outlet 12 and another end of the second oil outlet 13 are all provided on a side wall of the supporting wheel shaft 1.

Further, in order to facilitate the timely and efficient delivery of the lubricating oil stored in the first oil storage chamber 21 to the left and right floating oil seals of the supporting wheel, in an embodiment, a plurality of oil inlets 11 are provided and arranged circumferentially relative to a central axis of the supporting wheel shaft 1.

In an embodiment, there are provided with two oil inlets 11. The two oil inlets 11 are both arranged along the radial direction of the supporting wheel shaft 1 and the axes of the two oil inlets 11 are distributed on the same straight line. When the supporting wheel shaft 1 is installed to the wheel body 2 of the supporting wheel, it can be arranged that the oil inlet end of one of the oil inlets 11 is arranged vertically upward and the oil inlet end of another of the oil inlets 11 is arranged vertically downward.

In an embodiment, when the supporting wheel shaft 1 is installed to the wheel body 2 of the supporting wheel, it can be arranged that the first oil outlet 12 and the second oil outlet 13 are distributed on a same vertical plane, and the first oil outlet 12 and the second oil outlet 13 are both used to discharge oil in an upward direction.

In an embodiment, when the supporting wheel shown in this embodiment is walking and operating in an inclined state relative to the axis, the lubricating oil stored in the first oil storage chamber 21 will automatically flow to the lubricating environment of the floating oil seal at a low position under the action of gravity, which will lead to a reduction of the amount of lubricating oil in the lubricating environment of the floating oil seal at a high position. In this embodiment, the oil outlet directions of both the first oil outlet 12 and the second oil outlet 13 are set to be upward, and then the lubricating oil on the high side can only flow to the first oil storage chamber 21 and the floating oil seal on the low side through the clearance between the wheel body 2 and the supporting wheel shaft 1 when the oil level of the lubricating oil on the high side is lower than the first oil outlet 12 or the second oil outlet 13 on the same side. Since the clearance is very small in size of 0.1-0.2 mm, the reflux speed of the lubricating oil is very slow, which causes the state of containing lubricating oil by the floating oil seal on the high side to maintain for a long time when the supporting wheel is walking in an inclined state; and the lubricating environment of the floating oil seal on the previous high side will quickly replenish the lubricating oil through the oil passage on the supporting wheel shaft 1 when the supporting wheel is back to the horizontal state.

In an embodiment, in order to facilitate the installation of the supporting wheel, the first end of the supporting wheel shaft 1 is provided with a first installation hole 15, and the second end of the supporting wheel shaft 1 is provided with a second installation hole 16. The first installation hole 15 and the second installation hole 16 shown in this embodiment can be arranged along an axial direction of the supporting wheel shaft 1 or along the radial direction of the supporting wheel shaft 1, which is not specifically limited.

In an embodiment, the first installation hole 15 and the second installation hole 16 shown in this embodiment are both threaded holes, and the first installation hole 15 and the second installation hole 16 are distributed along a central axis of the supporting wheel shaft 1.

In an embodiment, in order to facilitate the injection of lubricating oil, an oil filling port is provided between the first installation hole 15 and one end of the lubricating oil passage 14 and/or between the second installation hole 16 and another end of the lubricating oil passage 14, and the oil filling port is detachably equipped with a plug 17.

In an embodiment, the number of the oil filling port shown in this embodiment is one and the oil filling port is provided between the first installation hole 15 and one end of the lubricating oil passage 14.

In an embodiment, the first end of the supporting wheel shaft 1 shown in this embodiment is used to connect to the first end cover 3 of the supporting wheel by coaxial connection in a clearance fit manner; and the second end of the supporting wheel shaft 1 is used to connect to the second end cover 4 of the supporting wheel by coaxial connection in a clearance fit manner.

In order to facilitate the sealing and positioning of the first end cover 3 and the second end cover 4, in an embodiment, the side walls of both the first end and the second end of the supporting wheel shaft 1 are provided with an annular sealing groove 18 and an annular stop groove 19; at the first end of the supporting wheel shaft 1, the annular sealing groove 18 is located between the annular stop groove 19 and the first oil outlet 12; and at the second end of the supporting wheel shaft 1, the annular sealing groove 18 is located between the annular stop groove 19 and the second oil outlet 13.

In an embodiment, the annular sealing groove 18 is used to install a sealing ring, and the sealing ring is preferably an O-shaped ring; and the annular stop groove 19 is used to install a retaining ring, and the retaining ring is preferably a steel wire retaining ring.

Figure 3:
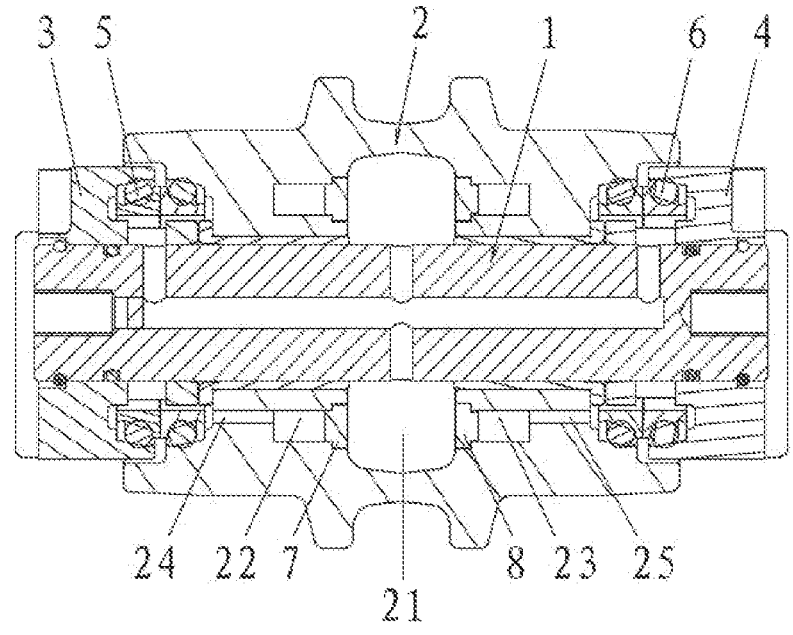
FIG. 3 is a schematic diagram illustrating a cross-sectional structure of a supporting wheel according to the present application.

As shown in FIG. 3, the embodiment of the present application provides a supporting wheel, including: a wheel body 2, a first end cover 3, a second end cover 4, a first floating oil seal 5, a second floating oil seal 6 and the above-mentioned supporting wheel shaft 1. The wheel body 2 is rotatably sleeved on the supporting wheel shaft 1; the wheel body 2 is provided with a first oil storage chamber 21, and the first oil storage chamber 21 communicates with the oil inlet 11; the first end cover 3 is sleeved on a first end of the supporting wheel shaft 1; an end surface of the first end cover 3 relative to the first end of the wheel body 2 is provided with a first installation chamber; inside of the first installation chamber is provided with the first floating oil seal 5 and the first installation chamber communicates with the first oil outlet 12; the second end cover 4 is sleeved on a second end of the supporting wheel shaft 1; an end surface of the second end cover 4 relative to the second end of the wheel body 2 is provided with a second installation chamber; and inside of the second installation chamber is provided with the second floating oil seal 6 and the second installation chamber communicates with the second oil outlet 13.

In an embodiment, by providing the first oil storage chamber 21 on the wheel body 2, the lubricating oil stored in the first oil storage chamber 21 can be injected into the lubricating oil passage 14 through the oil inlet 11, and then be delivered to the first floating oil seal 5 through the first oil outlet 12 while delivered to the second floating oil seal 6 through the second oil outlet 13, to make the lubricating environments of the floating oil seals on the left and right sides of the supporting wheel maintain sufficient lubrication oil.

In this way, compared with the design solution of a conventional supporting wheel, the present application not only increases the amount of lubricating oil at the floating oil seal in the case that the supporting wheel operates in a horizontal state, but also enables the environment of the floating oil seal at a high position to maintain a large amount of lubricating oil even if the supporting wheel inclines to the left or to the right when walking, to make the lubricating oil play a better role in lubricating and cooling the floating oil seal.

In order to ensure that the lubricating environments of the first floating oil seal 5 and the second floating oil seal 6 maintain sufficient lubricating oil, in an embodiment, the wheel body 2 may be further provided with a second oil storage chamber 22, a third oil storage chamber 23, a first oil guide passage 24 and a second oil guide passage 25; the first oil storage chamber 21, the second oil storage chamber 22 and the third oil storage chamber 23 are isolated from each other; the second oil storage chamber 22 communicates with one end of the first oil guide passage 24 and another end of the first oil guide passage 24 communicates with the first installation chamber; the third oil storage chamber 23 communicates with one end of the second oil guide passage 25 and another end of the second oil guide passage 25 communicates with the second installation chamber; and at least one of the first oil guide passage 24 and the second oil guide passage 25 extends along the axial direction of the wheel body 2.

The second oil storage chamber 22 and the third oil storage chamber 23 shown in this embodiment can assist the first oil storage chamber 21 to supplement lubricating oil to the floating oil seals on two sides of the supporting wheel, to make there is sufficient lubricating oil in the environments of the floating oil seals on two sides of the supporting wheel.

In an embodiment, the volume of the first oil storage chamber 21 can be set to be larger than that of the second oil storage chamber 22 and the third oil storage chamber 23. The second oil storage chamber 22 and the third oil storage chamber 23 shown in this embodiment can be symmetrically arranged on two sides of the first oil storage chamber 21.

In an embodiment, all the first oil storage chamber 21, the second oil storage chamber 22 and the third oil storage chamber 23 extend in the circumferential direction relative to a central axis of the wheel body 2 and form a ring shape; the first oil storage chamber 21 is groove-shaped and provided on an inner wall surface of a middle portion of the wheel body 2. A notch of the first oil storage chamber 21 faces a side surface of the supporting wheel shaft 1. In this way, the lubricating oil in the first oil storage chamber 21 not only can be delivered to the oil inlet 11, but also directly be delivered to the side surface of the supporting wheel shaft 1, to ensure lubrication between the side surface of the supporting wheel shaft 1 and the bushing on the wheel body 2.

In an embodiment, both the second oil storage chamber 22 and the third oil storage chamber 23 are provided in the wheel body 2 and are respectively provided on two sides of the first oil storage chamber 21 along the axial direction of the wheel body 2.

In order to facilitate the processing and manufacturing of the first oil storage chamber 21, the second oil storage chamber 22 and the third oil storage chamber 23 on the wheel body 2, a first sealing cover 7 and a second sealing cover 8 are further provided in an embodiment. The first sealing cover 7 is detachably provided between the second oil storage chamber 22 and the first oil storage chamber 21 to realize an isolation between the second oil storage chamber 22 and the first oil storage chamber 21; and the second sealing cover 8 is detachably provided between the third oil storage chamber 23 and the first oil storage chamber 21 to realize an isolation between the third oil storage chamber 23 and the first oil storage chamber 21.

Figure 4:
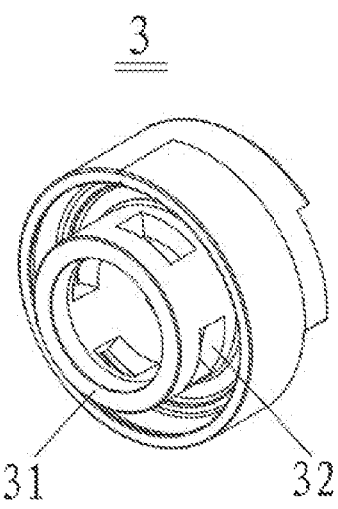
FIG. 4 is a schematic diagram illustrating a structure of a first end cover according to the present application.

As shown in FIG. 4, in order to further ensure that the amount of lubricating oil in the lubricating environments of the floating oil seals on both sides of the supporting wheel is sufficient, in an embodiment, there is provided a first shaft sleeve 31 between a shaft hole of the first end cover 3 and the first installation chamber; and a side wall of the first shaft sleeve 31 is provided with a plurality of first oil storage holes 32, and the first oil outlet 12 communicates with the first installation chamber through the first oil storage holes 32.

In this embodiment, the side wall of the first shaft sleeve 31 is provided with four first oil storage holes 32, and the four first oil storage holes 32 are uniformly distributed in a circle along the circumference of the first shaft sleeve 31.

Accordingly, in an embodiment, the present application provides a second shaft sleeve between a shaft hole of the second end cover 4 and the second installation chamber; and a side wall of the second shaft sleeve is provided with a plurality of second oil storage holes, and the second oil outlet 13 communicates with the second installation chamber through the second oil storage holes. Since the first end cover 3 has the same structure as the second end cover 4, the specific structure of the second end cover 4 would not be illustrated by the drawings in this embodiment.

In the case that the first end cover 3 is sleeved on the first end of the supporting wheel shaft 1, the supporting wheel shaft 1, the first shaft sleeve 31 and the first floating oil seal 5 enclose the first oil storage hole 32 to form a closed oil chamber. Since the closed oil chamber may store a certain amount of lubricating oil and the closed oil chamber communicates with the first floating oil seal 5, the environment of the first floating oil seal 5 may maintain sufficient lubricating oil.

In an embodiment, the present application provides a work machine including the above-mentioned supporting wheel shaft or the above-mentioned supporting wheel.

Specifically, since the work machine provided by this embodiment includes the above-mentioned supporting wheel shaft or supporting wheel, the work machine applies all the solutions according to all the above-mentioned embodiments, and therefore achieves at least all the beneficial effects brought by the solutions according to the above-mentioned embodiments. All the beneficial effects will not be repeated here.

The work machine shown in this embodiment may be a crawler excavator, a crane, etc., which is not specifically limited here.

Finally, it should be noted that the above embodiments are only used to illustrate the solutions of the present application, but not to limit them; although the present application has been described in detail with reference to the foregoing embodiments, those of ordinary skill in the art should understand that the solutions recorded by the foregoing embodiments can be modified, or some of the features therein can be equivalently replaced; and these modifications or replacements would do not make the essence of the corresponding solutions depart from the scope of the solutions of various embodiments of the present application.

What is claimed is:

1. A supporting wheel shaft, comprising:
an oil inlet, provided near a middle portion of the supporting wheel shaft and used to communicate with a first oil storage chamber on a wheel body of a supporting wheel;
a first oil outlet and a second oil outlet, wherein the first oil outlet is provided close to a first end of the supporting wheel shaft and used to extend to a first floating oil seal on the supporting wheel, and the second oil outlet is provided close to a second end of the supporting wheel shaft and used to extend to a second floating oil seal on the supporting wheel;
a lubricating oil passage, wherein the lubricating oil passage is provided inside the supporting wheel shaft and extends from the first end of the supporting wheel shaft to the second end of the supporting wheel shaft, the lubricating oil passage communicates with the oil inlet, the first oil outlet and the second oil outlet, respectively;
wherein the first oil outlet and the second oil outlet are distributed on a same vertical plane and are both used to discharge oil in an upward direction; when the supporting wheel is walking and operating in an inclined state relative to an axis, lubricating oil stored in the first oil storage chamber flows to a lubricating environment of the floating oil seal at a low position, the lubricating oil on a high side flows to the first oil storage chamber and the floating oil seal on a low side through a clearance between the wheel body and the supporting wheel shaft when an oil level of the lubricating oil on the high side is lower than the first oil outlet or the second oil outlet on the high side; and the lubricating environment of the floating oil seal on the previous high side replenishes the lubricating oil through an oil passage on the supporting wheel shaft when the supporting wheel is back to the horizontal state.

2. The supporting wheel shaft according to claim 1, wherein,
the lubricating oil passage extends along a central axis of the supporting wheel shaft, and at least one of the oil inlet, the first oil outlet and the second oil outlet is arranged along a radial direction of the supporting wheel shaft; and/or
the number of the oil inlet is multiple, and the multiple oil inlets are arranged circumferentially relative to the central axis of the supporting wheel shaft.

3. The supporting wheel shaft according to claim 1, wherein,
the first end of the supporting wheel shaft is provided with a first installation hole and the second end of the supporting wheel shaft is provided with a second installation hole;
an oil filling port is provided between the first installation hole and one end of the lubricating oil passage and/or between the second installation hole and another end of the lubricating oil passage, and the oil filling port is detachably equipped with a plug.

4. The supporting wheel shaft according to claim 1, wherein,
side walls of both the first end and the second end of the supporting wheel shaft are provided with an annular sealing groove and an annular stop groove, and at the first end of the supporting wheel shaft, the annular sealing groove is located between the annular stop groove and the first oil outlet, and at the second end of the supporting wheel shaft, the annular sealing groove is located between the annular stop groove and the second oil outlet;
wherein the annular sealing groove is used to install a sealing ring and the annular stop groove is used to install a retaining ring.

5. A supporting wheel, comprising:
a wheel body, a first end cover, a second end cover, a first floating oil seal, a second floating oil seal, and the supporting wheel shaft according to claim 1;
the wheel body is rotatably sleeved on the supporting wheel shaft and provided with a first oil storage chamber which communicates with the oil inlet;
the first end cover is sleeved on a first end of the supporting wheel shaft, and an end surface of the first end cover relative to the first end of the wheel body is provided with a first installation chamber, wherein inside of the first installation chamber is provided with the first floating oil seal and the first installation chamber communicates with the first oil outlet;
the second end cover is sleeved on a second end of the supporting wheel shaft, and an end surface of the second end cover relative to the second end of the wheel body is provided with a second installation chamber, wherein inside of the second installation chamber is provided with the second floating oil seal and the second installation chamber communicates with the second oil outlet.

6. The supporting wheel according to claim 5, wherein, the wheel body is further provided with a second oil storage chamber, a third oil storage chamber, a first oil guide passage and a second oil guide passage;

the first oil storage chamber, the second oil storage chamber and the third oil storage chamber are isolated from each other, and the second oil storage chamber communicates with the first installation chamber through the first oil guide passage, and the third oil storage chamber communicates with the second installation chamber through the second oil guide passage, wherein at least one of the first oil guide passage and the second oil guide passage extends along an axial direction of the wheel body.

7. The supporting wheel according to claim 6, further comprising: a first sealing cover and a second sealing cover;

wherein all the first oil storage chamber, the second oil storage chamber and the third oil storage chamber extend in a circumferential direction relative to a central axis of the wheel body and form a ring shape, and the first oil storage chamber is groove-shaped and provided on an inner wall surface of a middle portion of the wheel body, and a notch of the first oil storage chamber faces a side surface of the supporting wheel shaft, wherein the second oil storage chamber and the third oil storage chamber are both provided in the wheel body and are respectively provided on two sides of the first oil storage chamber along the axial direction of the wheel body;

the first sealing cover is detachably provided between the second oil storage chamber and the first oil storage chamber to realize an isolation between the second oil storage chamber and the first oil storage chamber, and the second sealing cover is detachably provided between the third oil storage chamber and the first oil storage chamber to realize an isolation between the third oil storage chamber and the first oil storage chamber.

8. The supporting wheel according to claim 7, wherein, a first shaft sleeve is provided between a shaft hole of the first end cover and the first installation chamber, and a side wall of the first shaft sleeve is provided with a plurality of first oil storage holes, and the first oil outlet communicates with the first installation chamber through the first oil storage holes; and/or, a second shaft sleeve is provided between a shaft hole of the second end cover and the second installation chamber, and a side wall of the second shaft sleeve is provided with a plurality of second oil storage holes, and the second oil outlet communicates with the second installation chamber through the second oil storage holes.

9. The supporting wheel according to claim 6, wherein, a first shaft sleeve is provided between a shaft hole of the first end cover and the first installation chamber, and a side wall of the first shaft sleeve is provided with a plurality of first oil storage holes, and the first oil outlet communicates with the first installation chamber through the first oil storage holes; and/or, a second shaft sleeve is provided between a shaft hole of the second end cover and the second installation chamber, and a side wall of the second shaft sleeve is provided with a plurality of second oil storage holes, and the second oil outlet communicates with the second installation chamber through the second oil storage holes.

10. The supporting wheel according to claim 5, wherein, a first shaft sleeve is provided between a shaft hole of the first end cover and the first installation chamber, and a side wall of the first shaft sleeve is provided with a plurality of first oil storage holes, and the first oil outlet communicates with the first installation chamber through the first oil storage holes; and/or, a second shaft sleeve is provided between a shaft hole of the second end cover and the second installation chamber, and a side wall of the second shaft sleeve is provided with a plurality of second oil storage holes, and the second oil outlet communicates with the second installation chamber through the second oil storage holes.

11. A work machine, comprising the supporting wheel according to claim 5.

12. A work machine, comprising the supporting wheel shaft according to claim 1.

* * * * *